July 1, 1958 C. S. ALLEN 2,841,249
EMERGENCY BRAKE MEANS FOR TRAILERS AND TRUCKS
Filed Dec. 27, 1955 3 Sheets-Sheet 1

Charles S. Allen
INVENTOR.

BY *Clarence A. O'Brien*
*and Harvey B. Jackson*
Attorneys

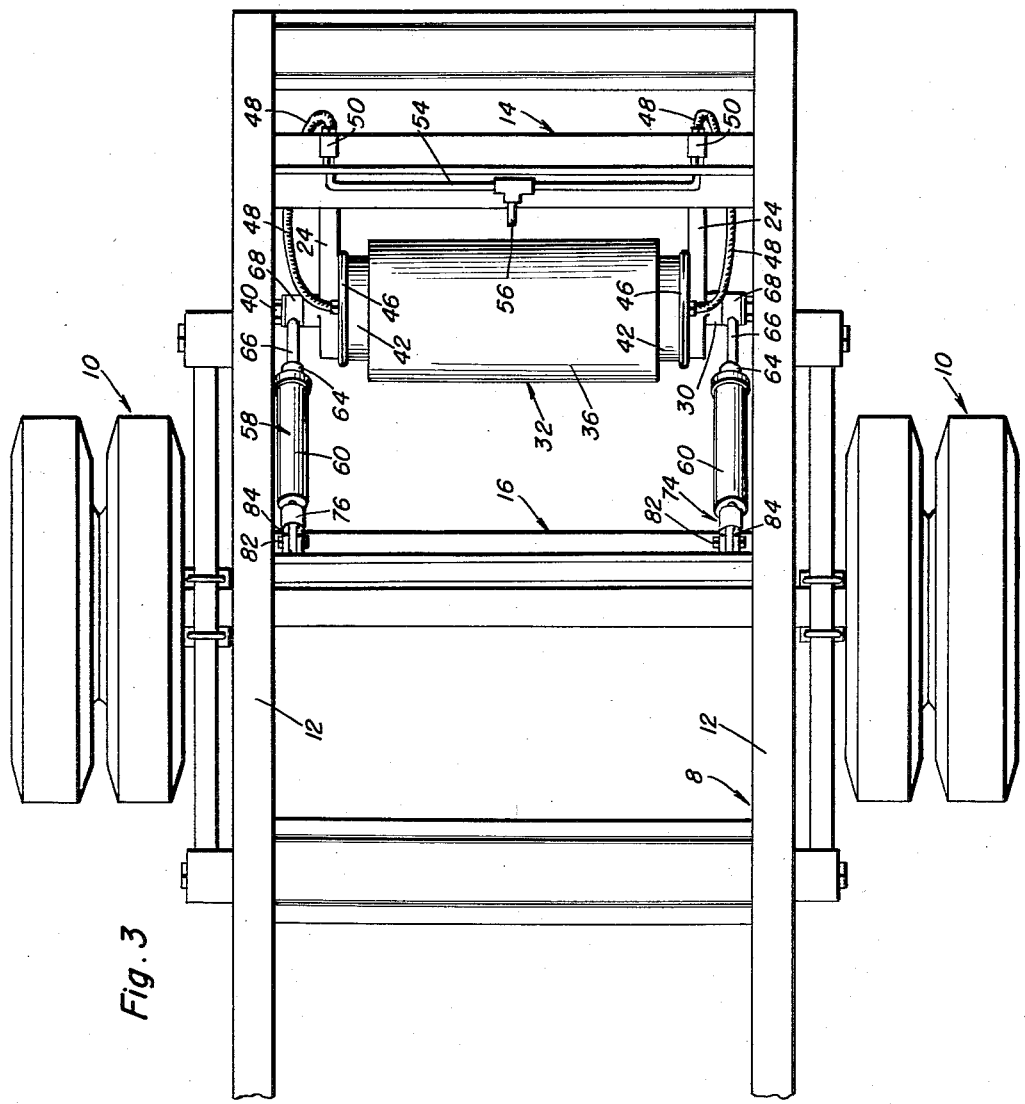

July 1, 1958 C. S. ALLEN 2,841,249
EMERGENCY BRAKE MEANS FOR TRAILERS AND TRUCKS
Filed Dec. 27, 1955 3 Sheets-Sheet 3

Charles S. Allen
INVENTOR.

BY *Clarence A. O'Brien
and Harvey B. Jacobson*
Attorneys

United States Patent Office 2,841,249
Patented July 1, 1958

2,841,249

EMERGENCY BRAKE MEANS FOR TRAILERS AND TRUCKS

Charles S. Allen, Bakersfield, Calif.

Application December 27, 1955, Serial No. 555,377

3 Claims. (Cl. 188—2)

This invention relates to vehicle brake means, generally speaking, and has reference, more specifically, to a vertically liftable and lowerable pavement contacting roller, or an equivalent device, which is ancillary to the vehicle's customary wheel brakes and which means supplements the wheel brakes and materially assists the operator or driver in effectively arresting the motion of the vehicle under emergency driving conditions and helps him to keep an otherwise unruly vehicle safely under control.

More explicitly, the invention has to do with a normally elevated and out-of-the-way rubber covered or equivalent elongated roller which is timely and properly forced into firm braking contact with a road or highway surface, one which is expressly, but not necessarily, applicable to trucks, trailers and similar heavy duty vehicles. It is suitably constructed and effectually mounted and is poised in readiness to be brought into action to assist in controlling the stated vehicle in a manner to guard against retrograde slippage on inclines, whether in motion or not, and also functions as an antiskidding device when slippery surfaces and unpredictable and hazardous driving conditions are suddenly encountered.

Briefly summarized, the preferred embodiment of the invention is characterized by a first horizontal support member fixedly mounted on the chassis of the trailer or other vehicle, a pair of hanger arms having upper ends hingedly mounted on and suspended from said support member, brake-equipped means mounted for rotation between the lower ends of said arms, a second horizontal support member fixedly mounted on said chassis forwardly of and parallel to said first support member, remote controlled fluid cylinders having their upper ends hingedly suspended from said second support member and their lower ends operatively connected with the lower portions of their respective arms, and remote controlled fluid means mounted in part on said first support member and operatively connected with said brake-equipped means.

More specifically, the brake-equipped means comprises a rigid core, which may be of wood and this is contained in a rubber or equivalent sleeve or covering to satisfactorily contact the highway surface. Friction brakes of a conventional type are mounted on the ends of the roller and the roller is provided with axial journals at its respective ends and these are mounted for rotation in bearings provided therefor on the lower ends of the stated arms. The fluid cylinder comprises a cylinder having a spring-returned piston slidable therein. The piston embodies a rod and the rod is pivotally connected at its lower end with the adjacent or cooperating arm. The source of fluid supply will be, in practice, appropriately remote controlled so that the roller-supporting arms may be thrust forcibly down into contact about the surface. At the same time the brake roller comes into contact with the highway surface, means on the upper ends of the arms operates suitable valves, whereupon the pressurized fluid automatically applies the brakes and renders the roller stationary.

Other objects, features and advantages will become more readily apparent from the following description and the accompanying sheets of drawings.

In the drawings, wherein like numerals are employed to designate like parts throughout the views:

Figure 3 is a plan view illustrating the complete assembly;

Figure 1:
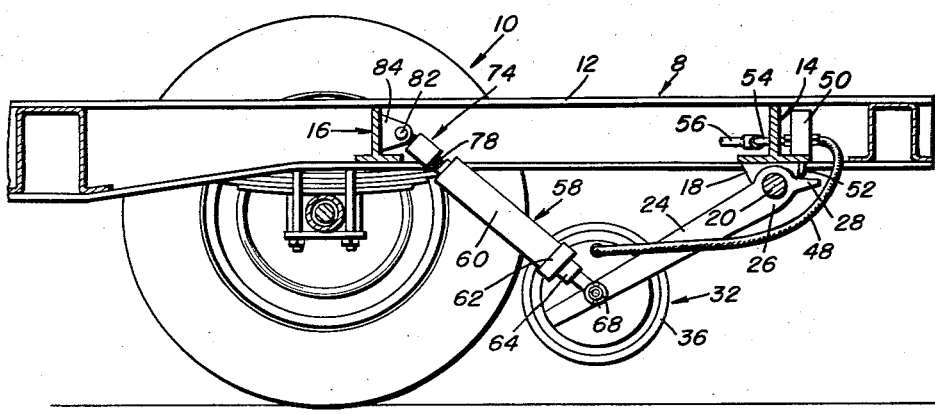
Figure 1 is a sectional and elevational view of the rear end portion of a wheel supported frame, for example, the frame of a trailer and showing the emergency brake means elevated and out of use.
Figure 2:
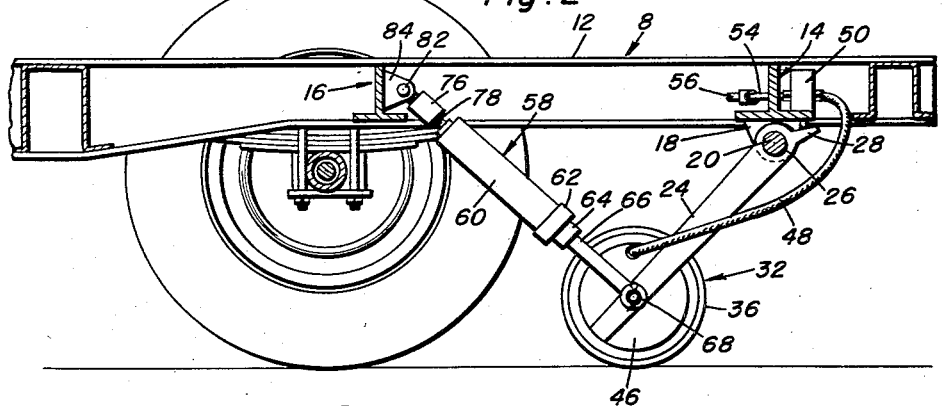
Figure 2 is a view like Figure 1 but showing the relationship of parts when the brake roller and fluid brakes thereon have been applied.
Figure 6:
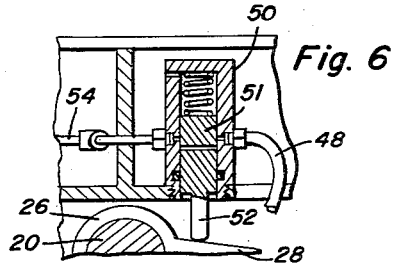
Figure 4:
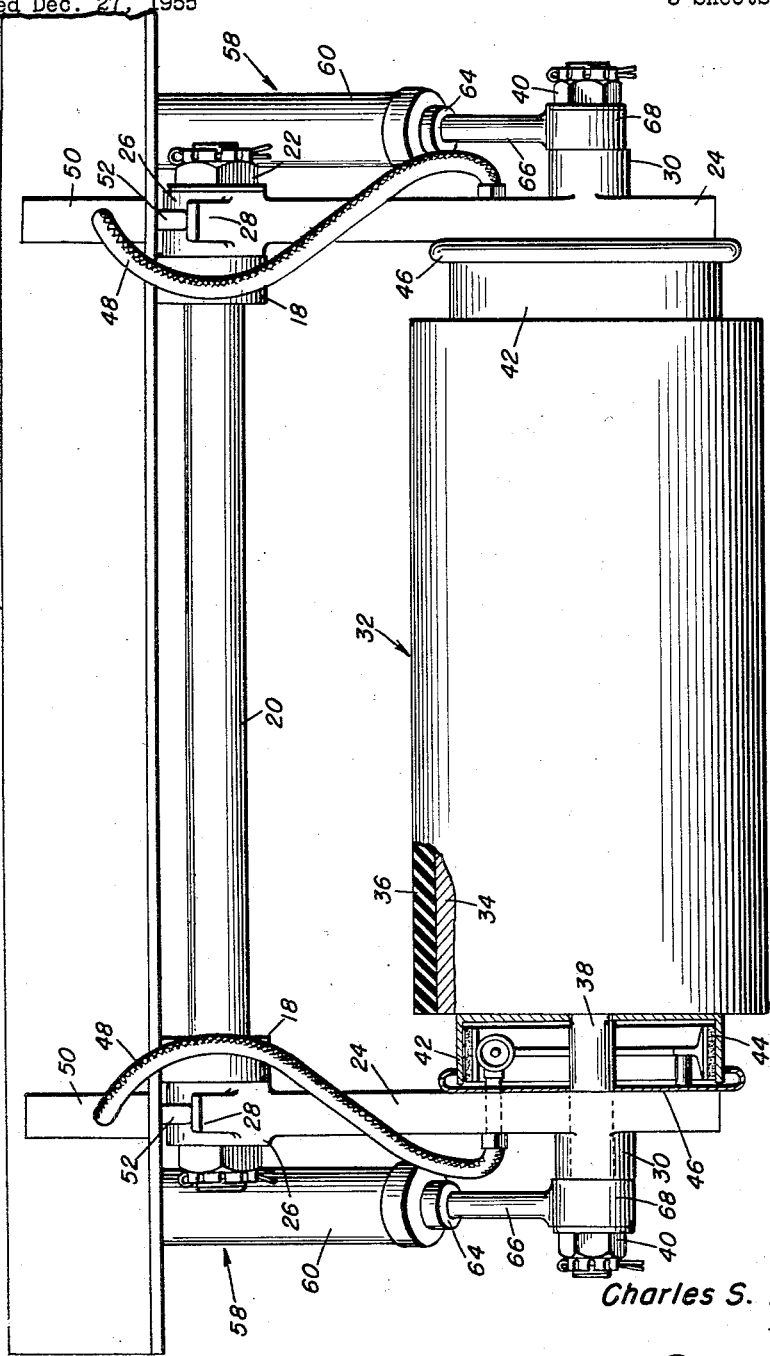
Figure 4 is an enlarged rear end elevation with portions broken away and shown in section.

Referring to the over-all structure and with particular reference to Figs. 1–3, the aforementioned trailer chassis is denoted by the numeral 8 and embodies a frame structure which is supported by wheels 10, as usual, said structure including frame members or rails 12. These rails are of customary channel form and serve to support a first fixedly mounted T-shaped horizontal support member 14. The second adapter or horizontal support member 16 is also T-shaped and similarly mounted. It is parallel to and spaced forwardly from the first member 14. Depending lugs 18 on the bottom flange serve to support a rod or shaft 20 held in place by nut means 22 (Fig. 4) on the respective ends thereof. This arrangement is, obviously, to suspend the hanger arms 24. These arms are provided with eyes or bearings 26 on their upper ends which are mounted for angular rotation in an obvious manner. Each eye is provided with a suitably angled projection which constitutes a trip lug 28 and which functions in a manner to be described. Suitable bearings 30 are provided on the lower ends of the arms. The braking means is supported between the arms 24 and is denoted generally by the numeral 32 and comprises an elongate wooden or equivalent roller 34. In practice, this may be some 12 inches in diameter and approximately 24 inches in length. In any event, it is covered by a rubber or equivalent casing or sleeve 36 which is designed to contact the pavement or similar road surface. Axially aligned projecting journals 38 are provided at the ends and these are mounted for rotation in the bearings where they extend beyond the bearings and are provided with assembling and retaining nuts 40. A brake drum 42 is suitably fixed to each end of the roller and the internal brake shoes are denoted at 44. These are conventional in type and are fluid pressure operated. The numeral 46 as best seen at the left in Fig. 4 is a backing plate and is mounted on the lower end portion of the arm. Fluid under pressure is supplied by way of one of the pair of hoses, each hose being denoted by the numeral 48. The hose is communicatively connected with the brake means at its lower end and at its upper end it is connected with a plunger type valve 50 (Fig. 6) mounted on the horizontal flange of the T-iron 14. The spring-biased ported valve or plunger is denoted at 51 and the stem is denoted at 52 and this in alignment with the trip lug 28, so that it is operated in a manner which is clearly brought out in Fig. 6. The numeral 54 in Fig. 1 designates a fluid pipe which is communicatively connected with the two valves 50 and which has a fluid delivery pipe 56 centrally connected thereto and leading to the cab or other source of supply (not shown).

Figure 5:
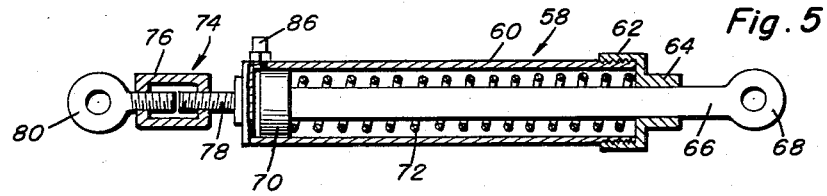
Figure 5 is a detailed view in section and elevation of one of the aforementioned fluid cylinders; and, Figure 6 is a detail view in section and elevation of one of the trippable brake applying valves.

The aforementioned fluid cylinders are denoted by the numerals 58 and these are hingedly hung or suspended from the forward T-iron 16. Each fluid cylinder comprises a cylinder 60 having a cap 62 on the lower end with a guide 64 for the piston rod 66. The rod is provided on its lower end with an eye or collar 68 which is hingedly connected with the cooperating extended end of the aforementioned journal 38 as shown at the left in Fig. 4. The piston proper is denoted at 70 and is reciprocable in the cylinder and is returned by way of a coil expansion spring 72. A hinging and adjusting coupling is provided on the upper end of each cylinder and this is similar to a turnbuckle and is denoted generally by the numeral 74 and comprises a sleeve nut 76 adjustably connected with a fixed stud 78 on the end of the cylinder and with a turned shank of an eye bolt 80. This eye bolt is hingedly mounted as at 82 between ears 84 fixed on the T-iron. The source of fluid is supplied to the cylinder by way of a communicable line or pipe 86 as seen in Fig. 5. This, too, will be remotely controlled and the means for doing the job is not shown.

A consideration of Figs. 1–4 will enable the reader to understand the construction and arrangement and mode of attaching the brake means to the vehicle chassis. It will be obvious, too, that when fluid under pressure is supplied to the fluid cylinders 58 and, assuming that the brake roller is elevated (as seen in Fig. 1), the pistons will act against the springs and will, in turn, force the hingedly suspended arms 24 downwardly until the rubber-covered braking roller 32 comes into contact with the surface. At about the same time, the trip lugs 28 will forcibly slide the spring returned plunger 51 and thus open the valves 50 and fluid will be supplied under pressure to the brakes and the brakes will be applied. Thus, the emergency braking device is brought into action and functions in an obvious manner. When the pressure on the fluid cylinders 58 is relieved, the springs 72 will return the pistons 70 to their normal positions and the brake roller will be elevated to the out-of-the-way clearance position seen in Fig. 1.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. Emergency brake means for trailers and trucks comprising, in combination, a mobile wheel supported vehicle chassis, a first elongated support member fixedly mounted in a horizontal position on said chassis, a pair of duplicate hanger arms spaced apart and having upper ends hingedly mounted on and serving to suspend the arms in raisable and lowerable positions beneath the support member, the lower ends of said arms being provided with axially aligned bearings, an elongated ground-engaging roller positioned in a plane below the plane of said support member and having axial journals fixed to and projecting from the respective ends of the roller and journaled for free rotation in their respectively provided bearings, fluid operated friction brakes interposed between the arms and roller and mounted for operation on the ends of said roller, fluid operated valves, one for each brake, mounted for operation on said support member, said valves being normally closed, the upper ends of said arms being disposed in proximity to their respective valves and having outstanding valve controlling trip lugs aligned with and swingable toward and from said valves, said arms, roller and brakes cooperating in defining a liftable and lowerable emergency brake assembly which, when retracted and elevated to a road clearing position relative to said chassis serves to move the trip lugs away from the valves and to a position during which the valves remain closed, and which when the assembly is swung down to an extended operating position brings the lugs into valve engaging and opening position, a second elongated support member fixed horizontally on said chassis forwardly of and parallel to said first support member, remote controlled fluid-cylinders having upper ends hingedly suspended from said second support member and lower ends operatively connected with the lower portions of their respective arms, and remote controlled fluid delivering and distributing means mounted for operation on said first support member and operatively connected with and for charging and readying said valves for functioning.

2. The structure defined in claim 1 and wherein each fluid-cylinder comprises a cylinder the upper portion of which is pivotally suspended from said second support member, and a spring-returned piston slidable in said cylinder, said piston having a depending rod and said rod being pivotally connected to a lower portion of that arm with which it is operatively associated.

3. The structure defined in claim 1 and wherein each valve comprises an encased spring-biased plunger normally in a closed position, said plunger having a stem depending below the valve casing, the aforementioned fluid delivering means serving to deliver fluid under pressure to said valves so that when the valves are opened the fluid is delivered by way of the hose to their respective brakes in a manner to apply the brakes, said trip lugs being cooperatively aligned with the stems whereby when the arms of said assembly swing down to and assume a predetermined angular position the lugs come into engagement with the stems and open the valves in time to apply the brakes.

References Cited in the file of this patent

UNITED STATES PATENTS

| | | |
|---|---|---|
| 1,236,971 | Nakamizo | Aug. 14, 1917 |
| 1,625,226 | Simmons | Apr. 19, 1927 |
| 2,062,931 | Raffa | Dec. 1, 1936 |
| 2,275,079 | Ingram | Mar. 3, 1942 |
| 2,478,653 | Callan | Aug. 9, 1949 |
| 2,613,955 | White | Oct. 14, 1952 |
| 2,650,679 | Durkin | Sept. 1, 1953 |